United States Patent [19]

Nagane

[11] Patent Number: 5,260,802
[45] Date of Patent: Nov. 9, 1993

[54] APPARATUS WITH NOISE SHIELDED CONTROL CIRCUIT SUBSTRATE

[75] Inventor: Hiromichi Nagane, Yokohama, Japan

[73] Assignee: Canon Kabushiki Kaisha, Tokyo, Japan

[21] Appl. No.: 710,833

[22] Filed: Jun. 5, 1991

[30] Foreign Application Priority Data

Jun. 7, 1990 [JP] Japan .................................. 2-150215
Jul. 11, 1990 [JP] Japan .................................. 2-184650

[51] Int. Cl.$^5$ .............................................. H04N 5/64
[52] U.S. Cl. ...................................... 358/400; 361/736
[58] Field of Search .................. 358/400, 401, 254, 75; 361/390, 391, 393, 394, 395, 397, 399, 400, 412, 415, 419, 420

[56] References Cited

U.S. PATENT DOCUMENTS

4,513,354  4/1985  Abel ..................................... 361/399
4,661,889  4/1987  Fushimoto ........................... 361/424
4,686,608  8/1987  Hosking ............................... 361/391
4,716,493  12/1987  Zelkowitz ........................... 358/254
5,051,868  9/1991  Leverault et al. .................. 361/399

Primary Examiner—Edward L. Coles, Sr.
Assistant Examiner—Jerome Grant, II
Attorney, Agent, or Firm—Fitzpatrick, Cella, Harper & Scinto

[57] ABSTRACT

In the apparatus in accordance with the present invention, a control circuit substrate is arranged in the bottom portion of the apparatus body, a metallic bottom cover capable of opening and closing the bottom portion of the apparatus serves as a support member, a metallic plate for noise shielding is disposed on the body frame between the control circuit substrate and the body frame, and the gap formed between the metallic plate and the body frame is a space for arranging the bundled wires derived from the control circuit substrate.

3 Claims, 10 Drawing Sheets

APPARATUS WITH NOISE SHIELDED CONTROL CIRCUIT SUBSTRATE

BACKGROUND OF THE INVENTION

1. Field of the Invention

The present invention relates to a facsimile apparatus having a control circuit substrate in which noise shielding and ground connections have been effected.

2. Related Background Art

With the rapid spread of facsimiles all over the world in recent years, it is required to be easily cope with different power supplies such as 100 V, 120 V and 230 V and different public lines in various counties. Moreover, it is also desired that parts be easily molded and fabricated in any place as they are locally manufactured all over the world. Further, a facsimile structure easy to perform the maintenance work is also needed.

In addition, the restriction against noise radiated from the apparatus is getting severe day by day. It is also required to prevent the malfunction arising from static electricity applied to the apparatus by the operator, and it is important that the malfunction arising from the static electricity caused by the apparatus itself due to the internal recording action be prevented.

Figure 11:
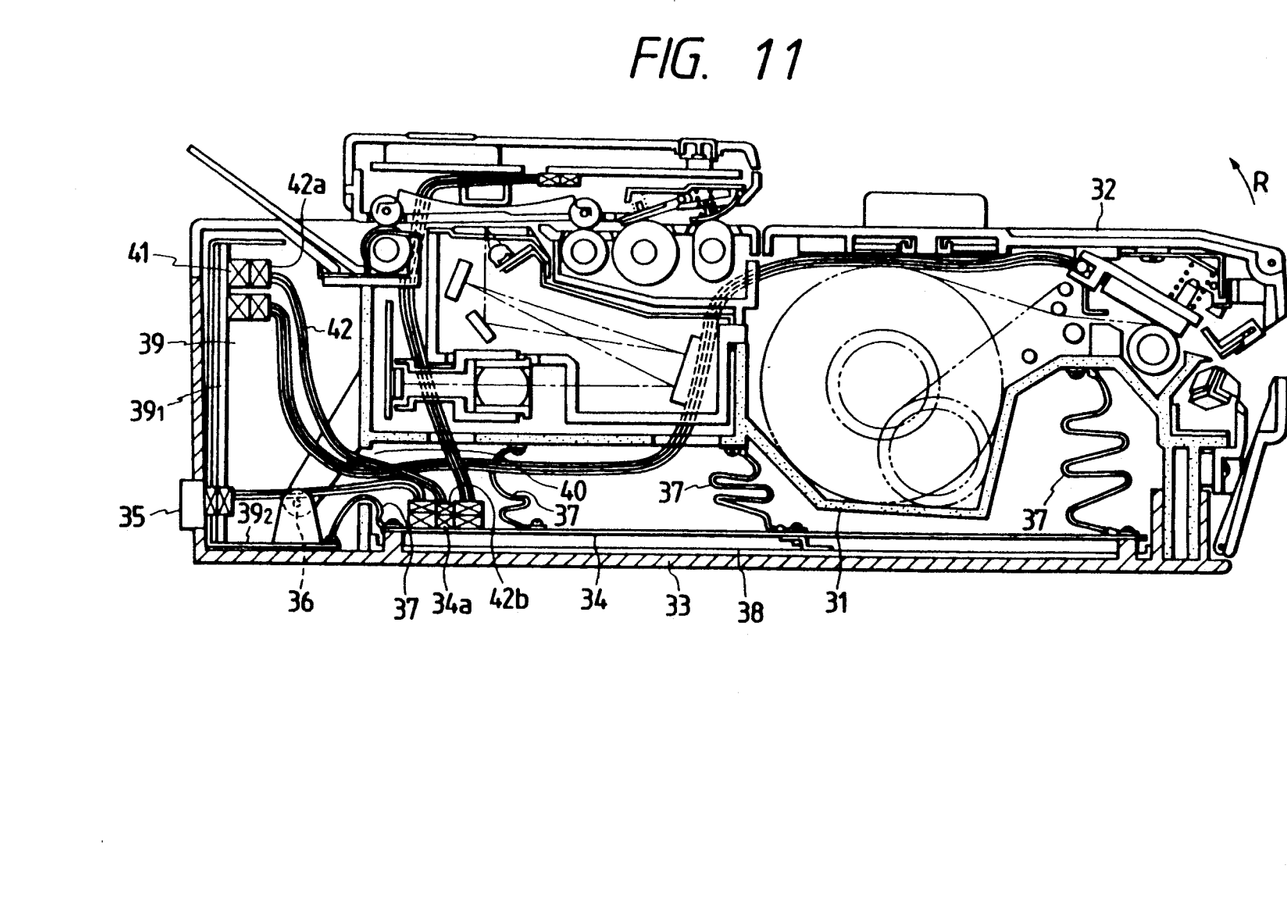
FIG. 11 shows a structure of the conventional facsimile apparatus.

The conventional facsimile apparatus has a construction in which a plurality of molded top covers 32 and bottom covers 33 are mounted on a molded body frame 31 as shown in FIG. 11. In order to assemble such facsimile, a control circuit substrate 34 (including a system control unit and a network control unit) is first attached onto the bottom cover 33, and then there is arranged the body frame 31 on which units and electronic components are assembled so as to drop-in. In the course of this assembling, an input/output terminal 35 for circuits or the like is fixed to the far side (left side in the figure) of the bottom cover 33. Finally, the upper cover 32 and the like are mounted to complete the assembling.

Besides, as a noise shielding means, a conductive coating is applied to the bottom surface of the body frame 31 and the top surface of the bottom cover 33, which are connected through a multiplicity of ground wires 37 to the ground of a power supply source. Further, a shielding metallic plate 38 is disposed between the circuit substrate 34 and the bottom cover 33.

Signal lines extending from the control circuit substrate 34 to sensors, a recording means, and a reading means are previously connected by the respective connectors or the like, and finally while forcing the separate cables in, the body frame 31 is put down to close the cover and the like. As a result, the wires are caught by the working parts to lead to a malfunction such as short-circuiting. Furthermore, when the noise shield is provided under the control circuit substrate 34, the shielding metallic plate 38 is arranged over the bottom cover 33, to consequently present a double structure of the metallic plate and the molded part under the substrate 34, thus leading to the increase in thickness of the entire apparatus, which prevents the miniaturization of the apparatus.

Moreover, as a measure to prevent the radiation noise, a conductive coating is applied to the bottom cover 33, the body frame 31 and the like, but a multiplicity of ground wires must be screwed to the frame to ground the coating. Since the conductive coating has a film thickness of only several 10 $\mu$m, it must be grounded at more points as compared to the metallic plate having a thickness of 0.5 to 1.0 mm so as to obtain a noise shielding effect. Also, the conductive coating itself is substantially expensive, which causes an increase in the production costs along with the bundling work of the ground cables as described earlier. Furthermore, signals transmitted from the circuit substrate 34 to an operation panel or a thermal head are switched at high speed, which produces a noise. In the above-mentioned assembling method, the position of the signal wires and the like on the circuit substrate 34 differs according to the assembling step, thus making it very hard to control the prevention of noise occurrence.

In order to compensate the inconveniences described above, there is proposed an apparatus in which the cover members are molded in stead of using metallic plates so as not to cause static electricity. In this case, however, an aperture for connecting the terminals on the circuit substrate 34 must be provided on the side wall of the bottom cover, with result that there must be provided various shapes of apertures for modules or terminal supports which differ depending on the destinations in the world, thus leading to the increase in the production cost due to the manufacture of other bottom covers using expensive dies.

Moreover, a power supply unit 39 is separated from the circuit substrate 34 by the body frame 31, and hence the electrical connection between the power supply unit 39 and the circuit substrate 34 is carried out through an aperture 40 provided on the body frame 31. Ground connections for the power supply unit 39 and the circuit substrate 34 are also conducted through the aperture on the body frame 31 in the same manner.

Here, description will be made of the case where the control circuit substrate 34 is used as the circuit substrate unit with reference to FIG. 11.

In the output section of the power supply unit 39, a power supply connector 41 is fitted to the output circuit of a power supply substrate $39_1$, while a control connector 34a is fitted to the control circuit substrate 34.

To electrically connect the power supply unit 39 with the control circuit substrate 34 during the assembly, a first connector 42a located at one end of a connection cord 42 is previously coupled with a power supply connector 41 of the power supply substrate $39_1$, a second connector 42b located at another end of the connection cord 42 is inserted into the aperture 40 from a power supply unit receiving section side (the left side in the figure), and then the power supply unit 39 is dropped in the receiving section provided at the end of the apparatus body. And finally the second connector 42b of the connection cord 42 is linked with a control connector 34a of the control circuit substrate 34.

Also, as measures to prevent static electricity and the falling of a thundervolt, a power supply unit frame $39_2$ and the control circuit substrate 34 are connected to the ground wire 37 by means of screws respectively, so as to equalize the voltage to ground between the power supply unit 39 and the control circuit substrate 34.

Due to this, the ground wire 37 also must go through the aperture 40 on the body frame 31 to execute the ground connections for a power supply unit frame $31_2$ and the control circuit substrate 34. At the time of assembling, one end of the ground wire 37 is previously connected to the power supply unit frame $31_2$, whereas the other end of the ground wire 37 is inserted into an aperture 35 from the power supply unit receiving section side (left side in the figure), and then the power supply unit 31 is dropped in the receiving section provided at the end portion of the apparatus body to complete the assembly.

The operations for inserting the connection cord 42 and the ground wire into the aperture are difficult to carry out by an automatic machine, and hence it is to be manually performed. Accordingly, in the case where each unit is automatically assembled by a drop-in method, during the assembly of the power supply unit 39, the automatic assembly has to be temporarily interrupted to perform a manual working. After that, the automatic assembling work is restarted, which leads to the increase in the number of working processes, resulting in an extremely insufficient and time-consuming assembling steps, to consequently bring about a raise in production costs.

SUMMARY OF THE INVENTION

It is an object of the present invention to overcome the above disadvantages and provide a facsimile apparatus having a control circuit substrate whose noise is shielded and cable means can be arranged without any difficulty.

Another object of the present invention is to effectively execute ground connections for a power supply unit and a circuit substrate unit.

Further object of the present invention will be apparent from the following exemplified embodiments.

DESCRIPTION OF THE PREFERRED EMBODIMENTS

An embodiment of the present invention will be described hereinafter with reference to the accompanying drawings.

Figure 1:
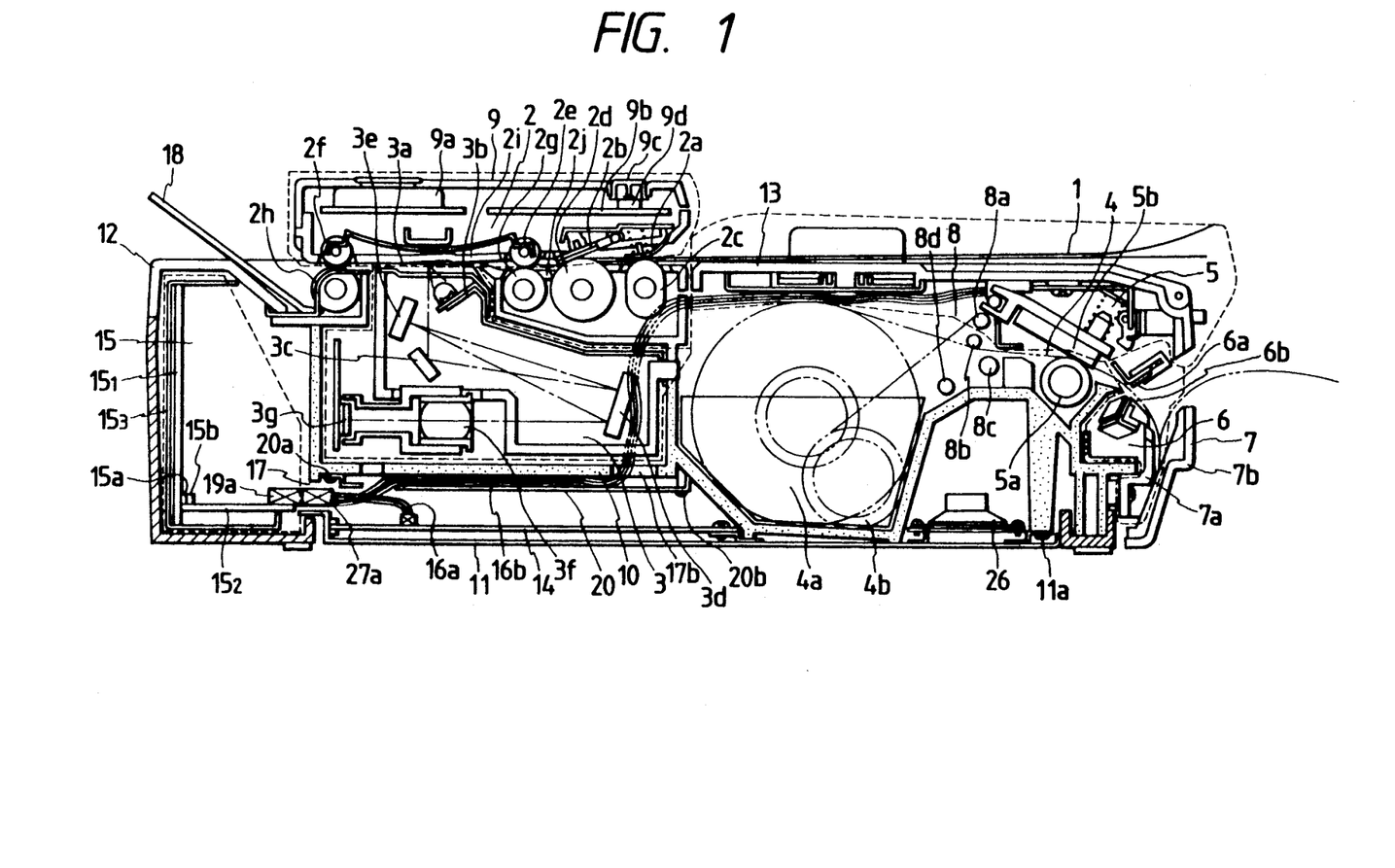
FIG. 1 shows a structure of the facsimile apparatus in accordance with an embodiment of the present invention.
Figure 2:
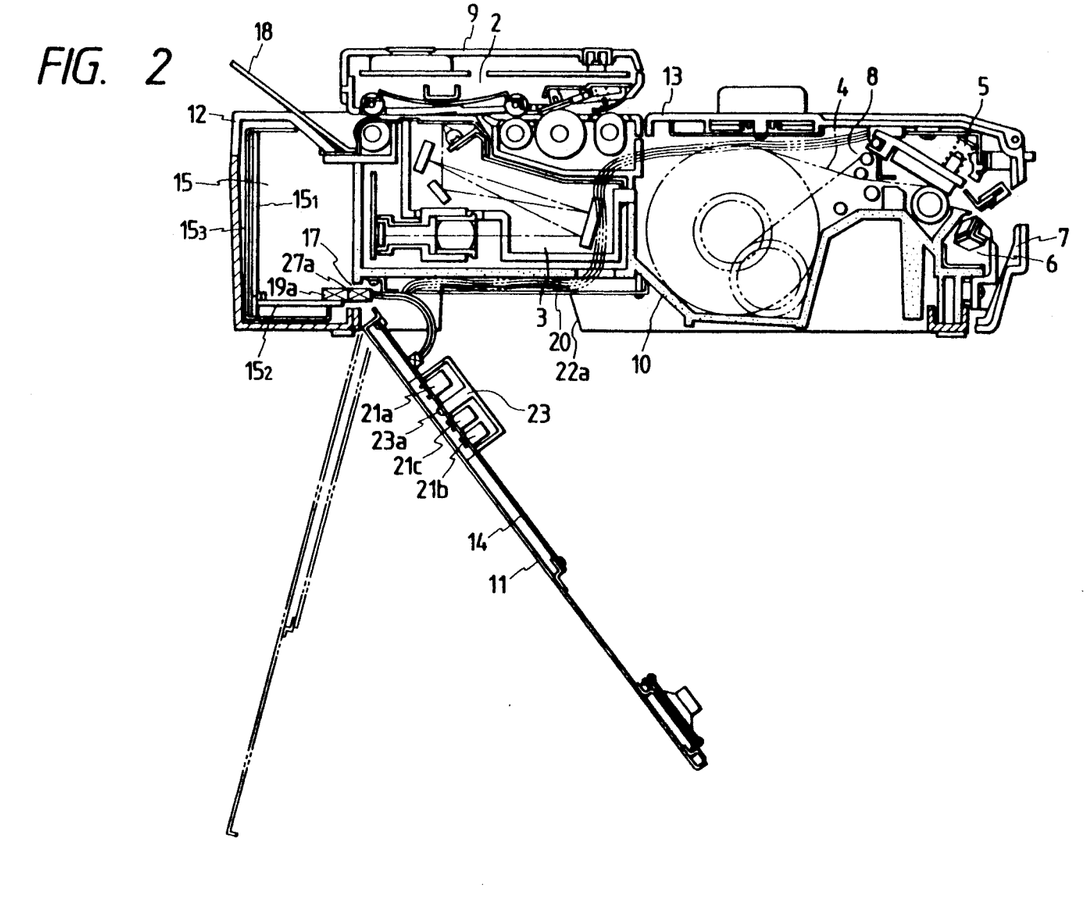
FIG. 2 shows the apparatus in FIG. 1 with the bottom cover opened.
Figure 3:
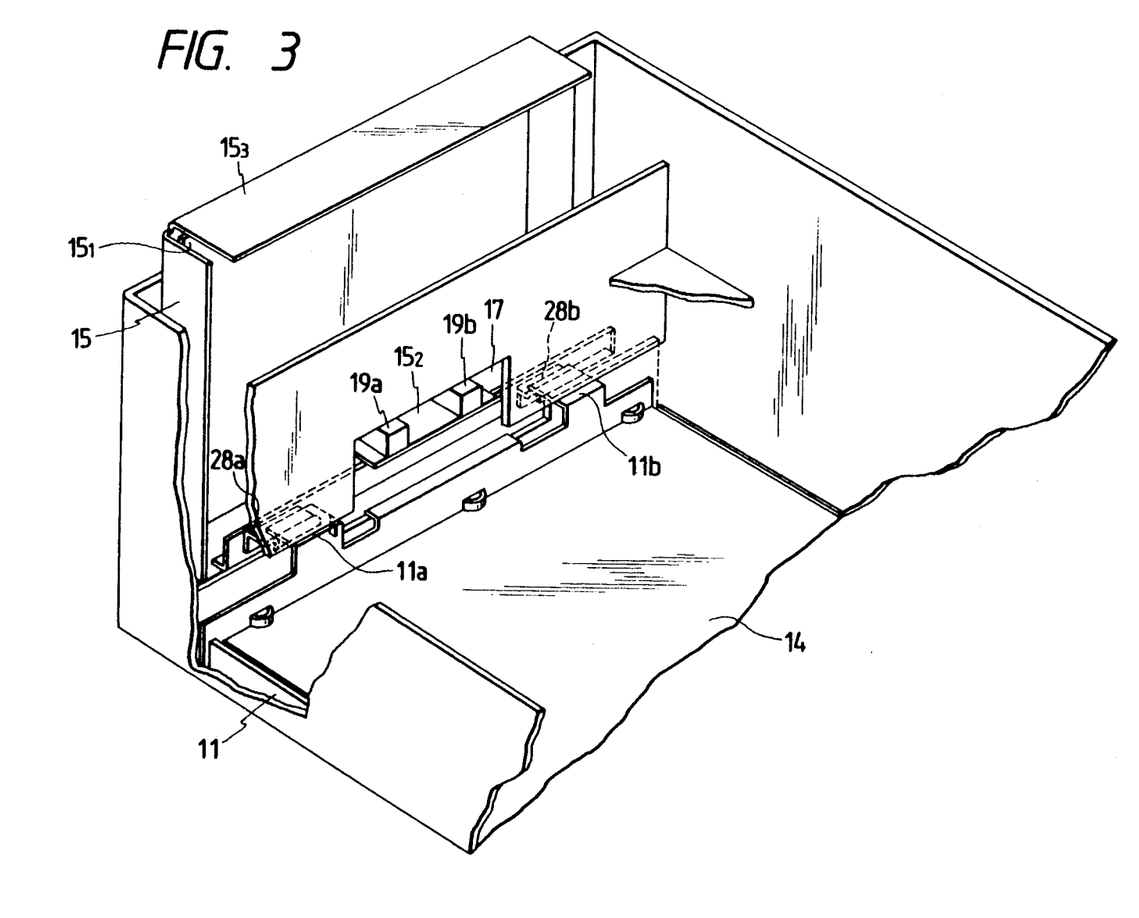
FIG. 3 is a detailed view showing the engagement section of the bottom cover in FIG. 1.

FIG. 1 shows the overall structure of the apparatus, where reference numeral 1 denotes an original, 2 a document conveying section which forms at its lower portion an assembling unit as shown by a broken line. Reference numeral 3 represents an optical reading section which forms a unit at the time of assembling as shown by a broken line, reference numeral 4 denotes a thermosensible recording paper, 5 a printing section, and 6 a record paper cutting portion which forms a unit when assembled as shown by a broken line. Reference numeral 7 denotes an ejected paper stack, 8 a record paper curling elimination section, and 9 an operation panel which forms a unit as shown by a broken line in cooperation with the upper portion of the document conveying section 2 when assembled. Reference numeral 10 denotes a body frame, 11 a bottom cover which is fitted to the body frame 10 by means of screws 11a and 11b, reference numeral 12 represents an upper cover, and 13 a recording cover which forms a unit as shown by a broken line in cooperation with the printing section 5 when assembled. Reference numeral 14 denotes a control circuit substrate which is separated by the body frame 10 from the other units and the electronic components and arranged in the bottom portion of the apparatus body. In order to repair the control circuit substrate 14 attached to the bottom cover 11, the bottom cover 11 can be opened as shown in FIG. 2 by removing the screws 11a and 11b. Reference numeral 15 is a power supply unit, 16a and 16b denote connection cords, and 17 an aperture provided on the body frame 10, through which the power supply unit 15 is connected to the control circuit substrate 14 with the aid of the connection cord 16a, and through which the printing section 5 is also connected to the power supply unit 15 with the aid of the connection cord 16b. Reference numeral 18 denotes an ejected paper receiving tray. Reference numerals 19a and 19b denote first connectors, 20 a metallic plate for noise shielding provided on the body frame 10 above the control circuit substrate 14. The metallic plate 20 performs the shielding for the control circuit substrate 14 in cooperation with the metallic bottom cover 11. Further, the metallic plate 20 is fixed to the body frame 10 with screws 20a and 20b. Between the metallic plate 20 and body frame 10, there is formed a gap for receiving a connection cord 16b which connects the printing section 5 and the power supply unit 15. Reference numeral 26 signifies a speaker, and 27a and 27b are second connectors.

Here, description will be made of the configuration of the power supply unit 15 and the electrical connection between the power supply unit 15 and the control circuit substrate 14.

In the power supply unit 15, there is vertically arranged a power supply circuit $15_1$ having various components, and perpendicular to which there is planted a support substrate $15_2$ to one end of which there are attached first connectors 19a, 19b. The substrates $15_1$ and $15_2$ are electrically connected by means of connectors 15a, 15b. The first connectors 19a, 19b facing the aperture 17 are connected to the output circuit of the power supply substrate $15_1$ through the wiring pattern of the support substrate $15_2$. Reference numeral $15_3$ denotes a power supply frame serving as a chassis and a cooling fin. The connection cord 16a has one end connecting to the input circuit of the control circuit substrate 14 and the other end connecting to the second connector 27a, 27b which are joined with the first connectors 19a, 19b of the power supply unit through the aperture 17.

Next, description will be made of the relationship between the bottom cover 11 and the frame $15_3$ of the power supply unit 15.

Figure 4:
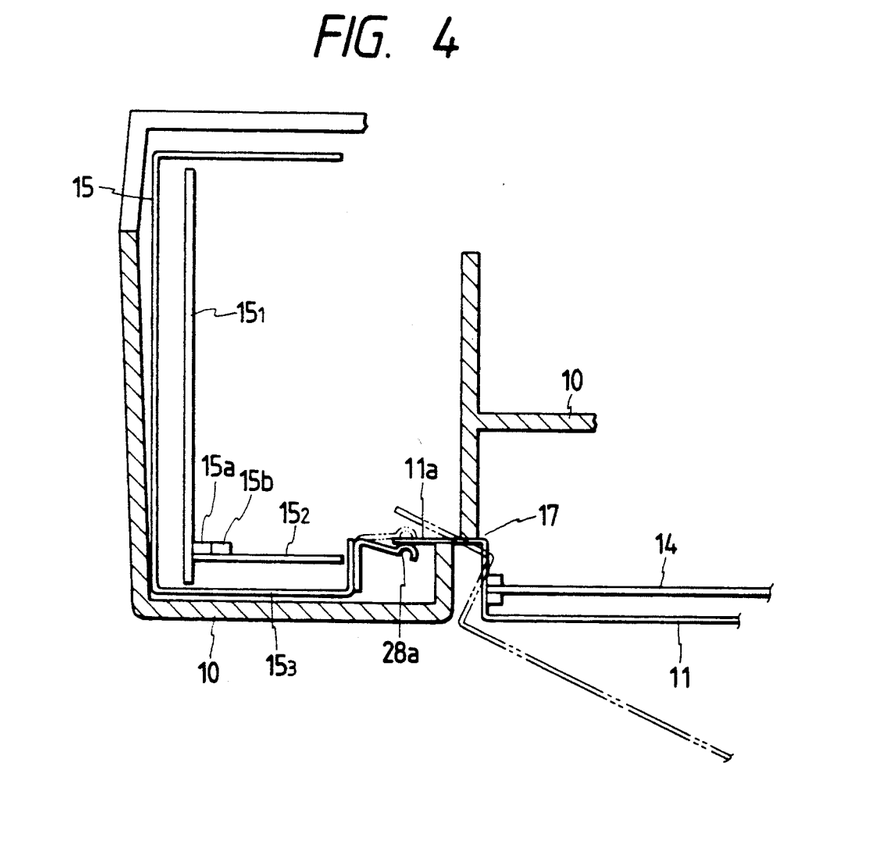
FIG. 4 is a sectional view of FIG. 3.

At both ends of the aperture 17, there is formed a gap so as to clamp the bent protrusions 11a, 11b. In addition, in the bottom portion of the frame $15_3$ of the power supply unit 15, there are fixed plate springs 28a, 28b being in contact with the bent protrusions 11a, 11b. When the bottom cover 11 is opened, the contact is released as shown in FIG. 4. In this way, when the bottom cover is closed, the protrusions 11a, 11b are brought into contact with the plate springs 28a, 28b to be electrically conducted, thus grounding the bottom cover 11 and the frame 15₃ of the power supply unit 15.

Figure 5:
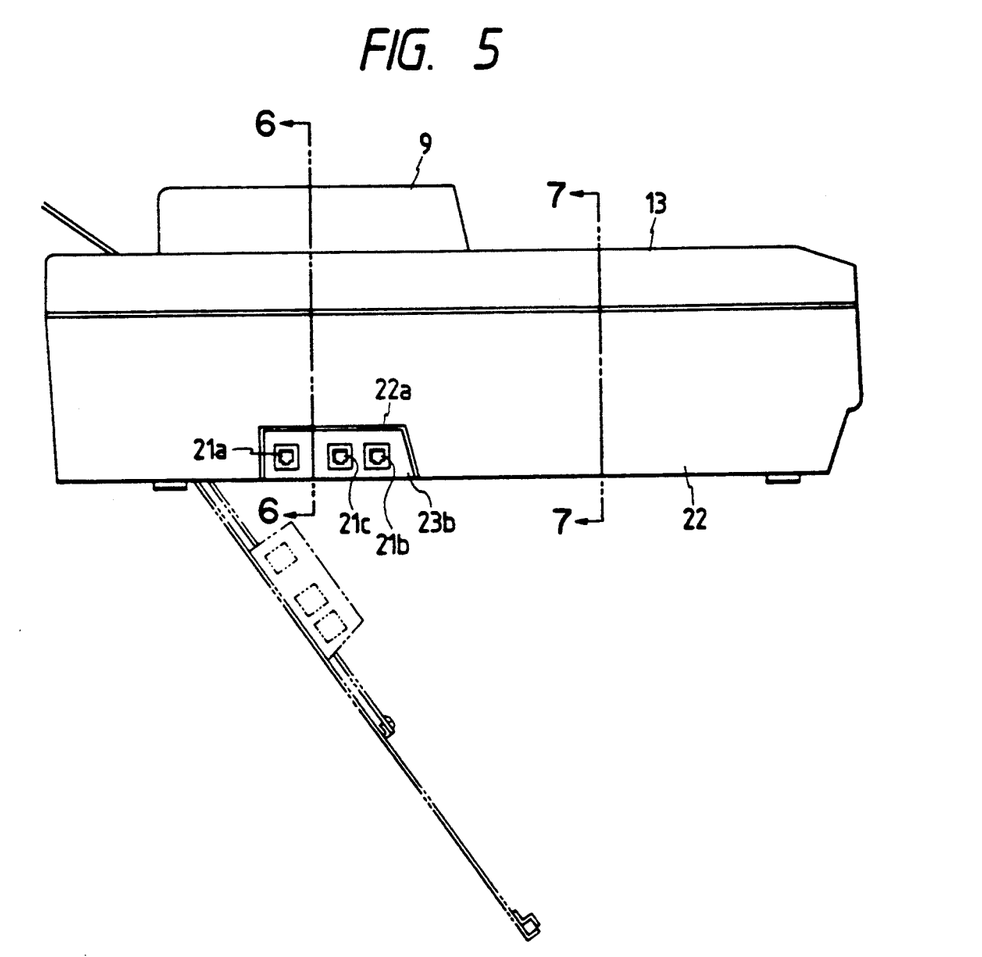
FIG. 5 is a lateral view of FIG. 1.

Here, FIGS. 2 and 5 are lateral views of the apparatus shown in FIG. 1, in which reference numeral 22 denotes side wall member which is molded separately from the body frame 10. The side wall member 22 has at both side walls cuts 22a, 22b for respectively receiving the modular covers 23, 24 which are fixed to the substrate 14 with screws 23a and 24a. Modular terminals 21a to 21c in the cover 23 are soldered to the substrate 14. 21A is a line input of a general telecommunication circuit network, 21b is a telephone line to a hand set attached to the facsimile, 21c is a sub-telephone terminal for connecting a sub-telephone apart from the facsimile body. A modular terminal 24d in the cover 24 is also soldered to the substrate 14 as shown in FIG. 6.

Figure 6:
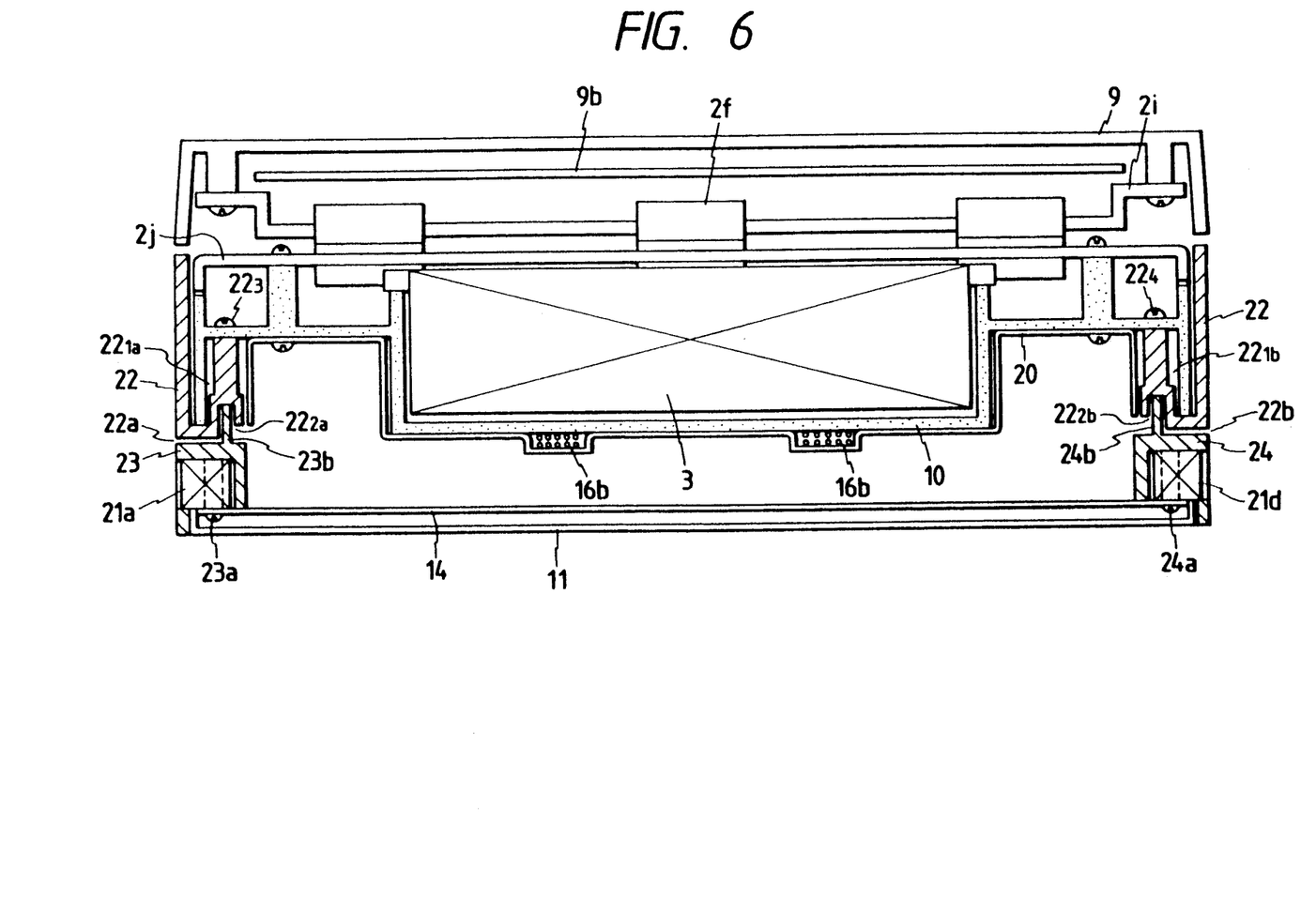
FIG. 6 is a sectional view taken along a line O—O in FIG. 5.
Figure 7:
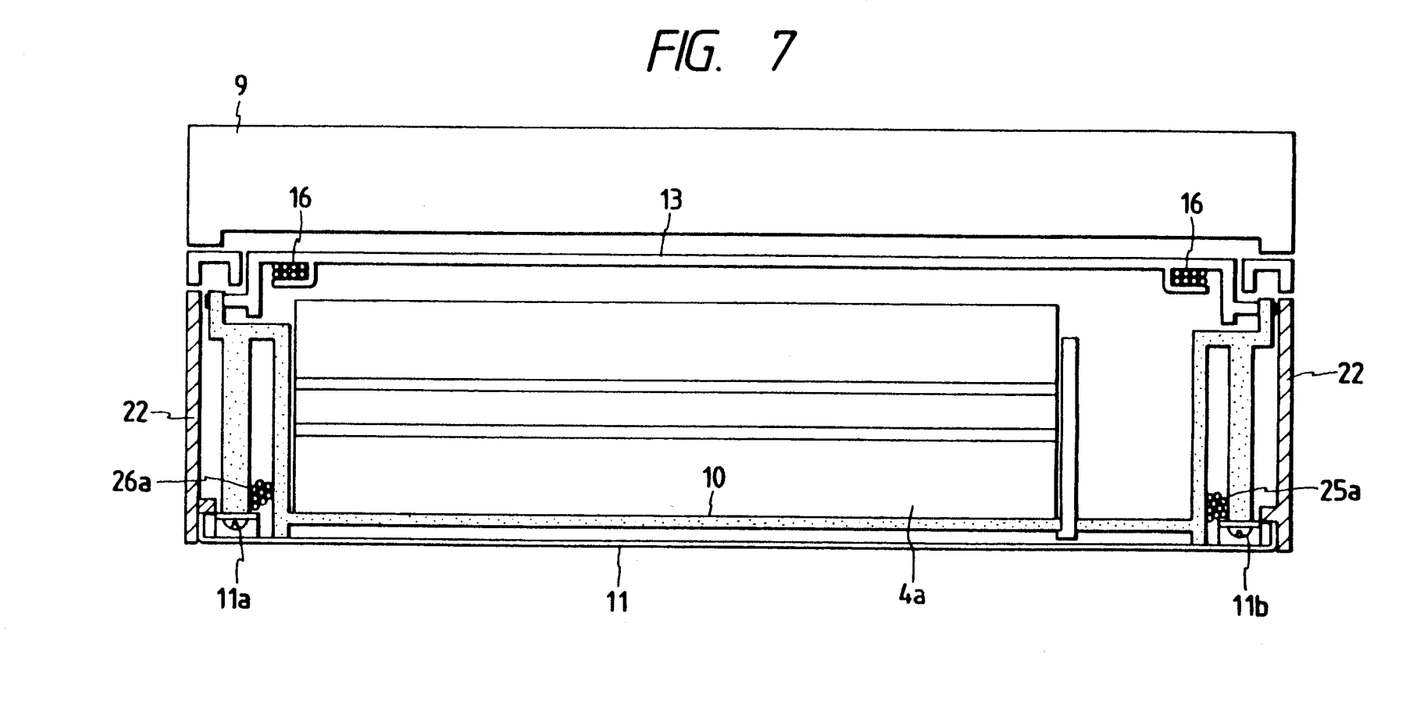
FIG. 7 is a sectional view taken along a line P—P in FIG. 5.
Figure 8:
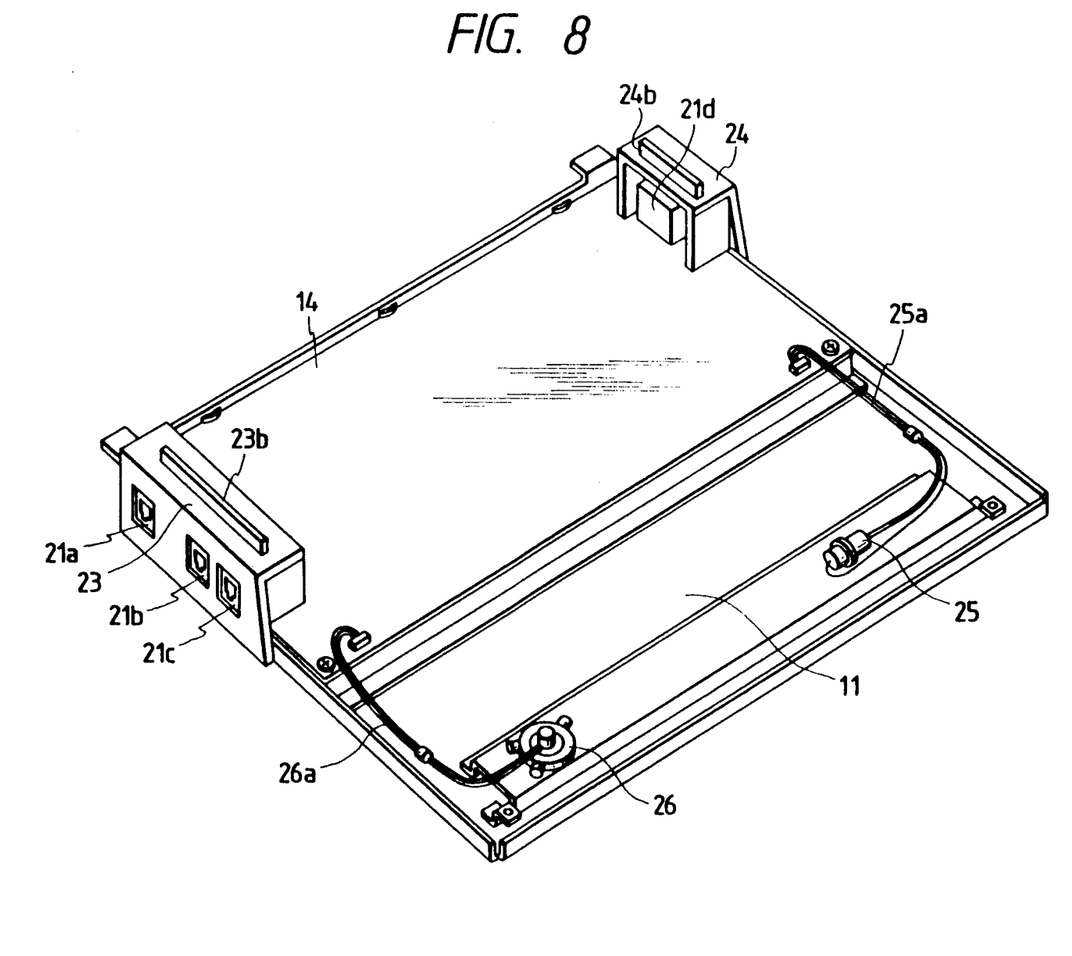
FIG. 8 is a perspective view of the bottom cover shown in FIG. 1.

Further, the side walls are planar except the cuts 22a, 22b for covers 23, 24 as shown in FIGS. 6 and 7. The cuts 22a and 22b each has at its upper portion grooves 22₁ₐ, 22₁ᵦ so as to engage with the body frame 10 as well as grooves 22₂ₐ, 22₂ᵦ which are engaged with protrusions 23b, 24b of the cover 23, 24. The side walls 22 are fixed to the body frame 10 with screws 22₃, 22₄. The bottom cover 11 is configured as shown in FIG. 8 in which 25 denotes a memory back-up battery of the apparatus, 25a is a signal line, and 26a is a signal line for the speaker 26.

In this way, the side wall member 22 is separately provided from the body frame 10, the space for the substrate 14 secured to the bottom cover 11 is defined by the side walls 22, and the bottom cover 11 is attached to the body frame 10, so as to maximize the space for mounting the substrate 14 and ensure the secure attachment of the bottom cover 11. Furthermore, the side walls of the side wall member 22 are provided with the cuts 22a, 22b which receive the modular covers 23, 24 equipped with the modular terminals 21a to 21d, and the modular covers 23, 24 along with the modular terminals 21a to 21d are in turn attached to the substrate 14, thereby decreasing the number of the signal lines and holding the conversion components for the change of destination together with the bottom cover 11 as one unit. The surroundings of the cuts 22a and 22b are strengthened by virtue of the modular covers 23, 24, side walls 22, and the body frame 10, thereby fully compensating the strength reduction caused by the formation of the cuts 22a, 22b.

Hereinafter, description will be made of the original conveying system, in which;

originals 1 stacked on the upper surface of the recording cover 13 are separated one by one with the aid of a preliminary conveying roller 2c in pressure-contact with a separation press piece 2a, and a separation roller 2d in pressure-contact with the separation friction piece 2b, conveyed by a paper feed roller 2g in pressure-contact with a press roller 2e, and a paper ejection roller 2g in pressure-contact with a press roller 2f, to finally stack up on the paper receiving tray 18. Reference numeral 2i means an upper original support, and 2j a lower original support.

Next, description will be made of the original reading system, in which;

the bottom surface of the original 1 further conveyed is illuminated by a light source 3b such as an LED array through a document glass 3a, the reflected light ray is led to a photoelectric conversion element 3g such as CCD by mirrors 3c, 3d, 3e through a lens 3f, and the obtained image is recorded by its own recording section 5 in copy mode, and transmitted to the recording portion of the other apparatus in facsimile mode (transmission mode).

The recording system will next be described, in which;

a thermosensible recording paper 4 in the form of roll paper is dropped in the roll receiving section of the frame 10. Reference numeral 4a shows a roll-full state and 4b shows a roll-empty state. The roll paper 4 is deprived of its curl by means of a curl eliminating section 8, and then conveyed in the direction of paper ejection by a platen roller 5a which is driven by a motor not shown. At that time, one-dot printing is carried out on the recording paper 4 through a heat-sensitive head (thermal head) 5b which is in pressure-contact with a platen roller 5a. As shown by a chain double-dashed line, the printed recording paper is passed between a fixed blade 6a and a rotationally shifting blade 6b of the cutter section, into a reverse tray section composed of an inner tray 7a and an outer tray 7b with its leading edge ahead. The recording paper successively fed by the platen roller is ejected to the outside of the apparatus turning in a loop with its leading edge inserted into the reverse tray section, to be ejected to the outside of the apparatus describing the loop shape. Each time one page is received, the shifting blade 6b is rotated upward in the figure to cut the paper, the trailing edge is ejected to the outside of the apparatus with the leading edge clamped.

Description will be made of the curl eliminating section 8, in which;

reference numeral 8a represents a shifting guide shaft, 8b a fixed shaft (which is fixed on the recording cover 13 side) and 8c a rotation axis of the guide shaft 8a. The shifting guide shaft 8a is positioned according to the remaining roll diameter of the roll paper 4, that is, it is delivered to a position 8a in the figure by a mechanism not shown when the roll paper is small just as the core diameter, while to a position 8d in the figure when the roll paper is almost full, thereby change the amount of the roll paper rolled up onto the fixed shaft 8b.

Based on the difference in the rolled amount, the degree of the curl elimination is altered, to constantly confer a uniform flatness to the ejected roll paper.

Besides, reference numeral 9 signifies an operation panel section, 9a a display such as a liquid crystal display LCD, 9d an operation panel control substrate OPCNT (operation control substrate), 9c a keytop, 9d a tact switch on the OPCNT.

Next, assembling of thus configured facsimile apparatus will be described.

In the first place, the injection-molded body frame 10 is attached to the side wall member 22 so as to fit the end of the body frame 10 into grooves 22₁ₐ, 22₁ᵦ of the side walls 22, and then the body frame 10 is secured to the side wall member 22 with screws 22₃, 22₄. Subsequently, each unit is dropped in and assembled in the body frame 10 by means of the automatic assembling machine.

At that time, the aperture 17 and the gap at both ends of the aperture 17 are formed. That is, first a unit equipped with the recording paper cutting section 6, and next a unit with the optical reading section 3 are mounted to the body frame 10, and then the power supply unit 15 is fitted into the receiving section of the body frame 10. Thus, the first connectors 19a, 19b which are connected to the output circuit of the power supply substrate $15_1$ through a wiring pattern of the support substrate $15_2$ is disposed so as to confront the body frame 10, thereby facilitating the connection of the second connectors 27a, 27b to the first connectors 19a, 19b through the aperture 17.

Further, a unit provided with the recording cover 13 and the printing section 5 is mounted to the body frame 10.

Furthermore, a unit with the lower portion of the original conveying section 2 is mounted to the body frame 10.

Finally, a unit equipped with the upper portion of the original conveying section 2 and the operation panel 9 is mounted to the body frame 10.

Thus the automatic assembly through drop-in of each unit is completed, followed by assembling the other components onto the body frame 10. In the course of the assembling the other components, the bottom cover 11 equipped with a control circuit substrate 14 and the speaker 19 is to be mounted to the body frame 10.

At that time, the bent protrusions 11a, 11b are inserted into the gaps at both ends of the aperture 17 so as to be clamped as shown in FIG. 4. Then, when the apparatus body is closed by mounting the bottom cover 11, the protrusions 11a, 11b are brought into contact with the plate springs 28a, 28b, to consequently bring the bottom cover 11 into secure contact with the frame $15_3$ of the power supply unit 15. Further, in order to electrically connect the control circuit substrate 14 to the power supply unit 15, the second connectors 27a, 27b of the connection cords 16a, 16b which are connected with the input circuit of the control circuit substrate 14 have only to be connected to the first connectors 19a, 19b of the the power supply unit 15 through the aperture 17 of the body frame 10.

Furthermore, the electrical connection between the control circuit substrate 14 and power supply unit 15, and other units are effected by the connection cord 16 through the aperture 17.

Next, description will be made of the cases where the assembling defect is adjusted and the control circuit substrate 34 is checked or replaced due to the maintenance in the market. By removing the screws 11a, 11b of the bottom cover 11 of the facsimile apparatus assembled as described above, the bottom cover 11 is opened as shown in FIG. 2. Providing the side surface on the far side of the apparatus is stood against the desk or the like, the bottom cover can be easily opened to check the control circuit substrate 14 and perform the troubleshooting. Further, what is required to change the destination is merely to replace the substrate 14 or entirety of the bottom cover 11 by virtue of the integrated structure of the substrate 14 with the modular terminals.

In the above embodiment, the modular covers 23, 24 are screwed to the substrates 14, but instead they may be fixed to the bottom cover 11. The similar effects can be also obtained by a temporary locking such as hooking by use of catches in place of screwing since the modular covers are clamped between the substrate 14 and the cover 11 at the time of assembling.

Besides, on the metallic plate serving as a shield plate which is attached to the bottom surface of the body frame, or on the body frame, there may be provided a groove so that the cables and the like can be previously fixed to the shield plate by means of bands. In order to heighten the shielding effects, cables may be dropped into the groove of the metallic plate and covered by the shield plate, and then attached to the frame. To further heighten the shielding effects, the right and left bent portions of the metallic plate as shown in FIG. 6 may be further extended downward to abut against the circuit substrate to achieve the ground connection, thereby forming a complete boxy enclosure. It is also conceivable to fix a noise elimination core onto the shield plate, and pass the cables through the core. Also, for the automatic ground connection, plate springs may be fixed to either the metallic plate serving as the shield plate or the bottom cover, to close the bottom cover.

Figure 9:
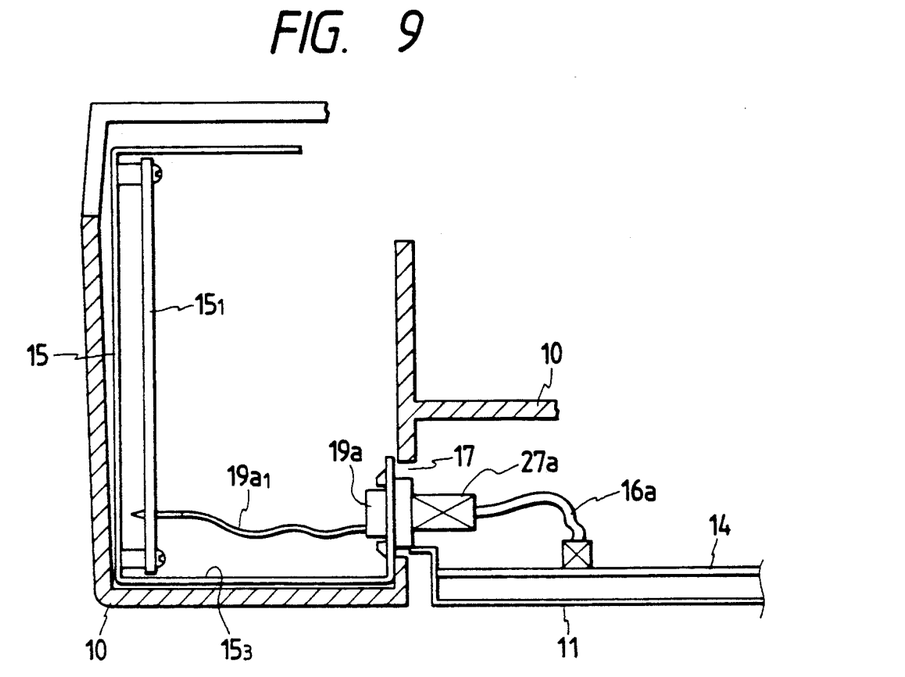
FIG. 9 shows another example of the connector connecting section in FIG. 1.

In the above embodiment, a sub-substrate loaded with connectors and serving as a support substrate is placed within the power supply. However, to obtain the similar effects, the connectors 19a, 19b may be fixed to the frame $15_3$ of the power supply unit 15 with machine screws, and connected with the main substrate $15_1$ through lead wires 19a, 19b as shown in FIG. 9.

Figure 10:
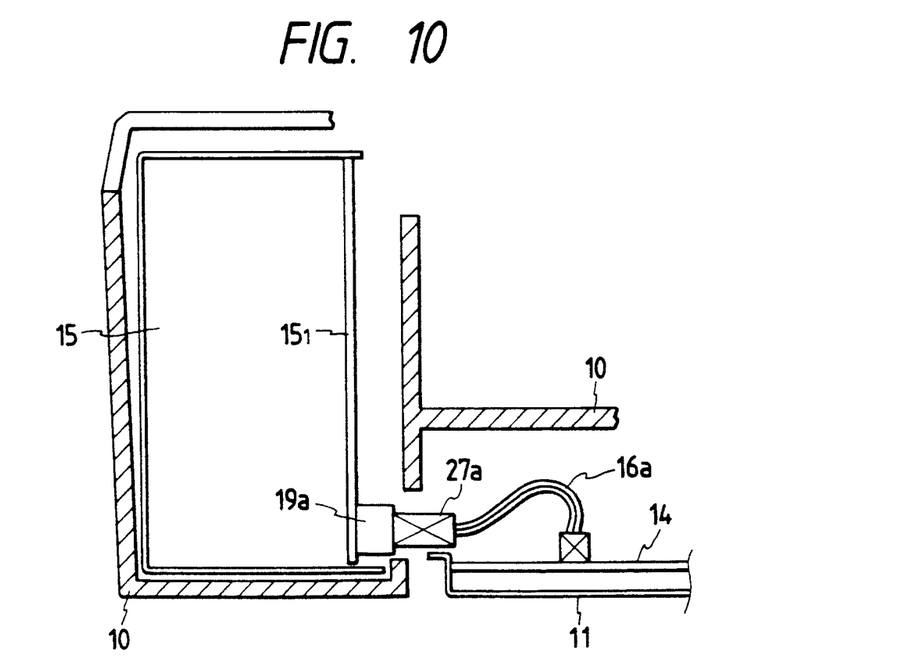
FIG. 10 shows further example of the connector connecting section in FIG. 1.

Also, in a structure having a space for arranging the power supply substrate $15_1$ in the center of the apparatus as shown in FIG. 10, it is possible that the connectors 19a, 19b are attached to the lower portion of the reverse side of the power supply $15_1$, and the connectors 27a, 27b from the control circuit substrate 14 are accessed through the reverse side of the substrate $15_1$. Further at this time, if a cut is provided at the lower portion of the substrate $15_1$ and a right angle type connector is used, the power supply output connectors 19a, 19b may be attached onto the surface of the substrate $15_1$, thus allowing the connector to be inserted from the lower portion of the control circuit substrate 14.

Also, the description of the above embodiment is made with regard to the structure where the power supply is not overlaid on the control circuit substrate 14 when perspectively viewed from the above of the apparatus body. Depending on the dimensions of the apparatus, the position of the power supply in FIG. 1 may be shifted upward to place the control circuit substrate on the far side in the lower portion of the power supply, whereby the control circuit substrate connector can be inserted upwardly from the below through the aperture of the bottom cover or the frame which is positioned below the power supply on the control circuit substrate, thus obtaining the similar effects.

In the above embodiment, the plate springs 28a, 28b are fixed on the power supply unit side while the protrusions are provided on the bottom cover 11 side. Nevertheless, the manner in contrast with this is also permissible.

According to the present invention as described in detail, the control circuit substrate is arranged in the bottom portion of the apparatus body so as to be separated by the body frame, the metallic bottom cover capable of opening and closing the bottom portion of the apparatus body serves as a support member of the control circuit substrate, a noise shielding metallic plate is disposed on the body frame between the control circuit substrate and the body frame, and the gap formed between the metallic plate and the body frame is a space for arranging the cables derived from the control circuit substrate, thereby reducing the works which are liable to cause errors such as forcing-in of the cables or other wires in the prior art, and the number of the assembling steps and the level of defectiveness.

Also, the bundling position is properly fixed for the each assembling apparatus, and hence the performance such as radiation noise shielding does not vary depending on the positions of the electric circuit and the cables, thereby stably providing apparatus having superior quality.

The present invention as described in detail hereinbefore, in which the circuit substrate unit and the power supply unit are arranged in the apparatus body so as to be separated from each other by the body frame, and the circuit substrate unit is ground-connected to the power supply unit frame through the aperture provided on the body frame, is characterized in that protrusions are provided on one of the circuit substrate unit frame and the power supply unit frame, and biasing members are provided on the other thereof, the aperture of the body frame is so formed as to be capable of clamping the protrusions, the protrusions are inserted into the aperture of the body frame to allow the protrusions to be brought into contact with the associated biasing member when the circuit substrate unit and the power supply unit are assembled into the apparatus body, and the circuit substrate unit frame is ground-connected with the power supply unit frame, and accordingly there is no inconvenience that the automatic assembly must be temporarily stopped to conduct the manual working during the automatic assembly, and highly effective assembling steps can be achieved without any interruption of the automatic assembly, while obtaining the secure grounding by the mounting the circuit substrate unit.

What is claimed is:

1. A facsimile apparatus, comprising:
an apparatus body including a body frame serving as a framework for said apparatus body;
a circuit substrate unit provided on said apparatus body;
a control circuit substrate arranged in the bottom portion of said apparatus body, said control circuit substrate being separated from said circuit substrate unit by said body frame;
cable means for electrically connecting said control circuit substrate and said circuit substrate unit, and other electric components;
a metallic bottom cover provided on the bottom portion of said apparatus body and serving as a support member for said control circuit substrate;
a shielding plate for noise shielding which is provided between said control circuit substrate and said body frame; and
a gap portion formed between said shielding plate and said body frame, said gap being a space for arranging at least a portion of said cable means, wherein said metallic bottom cover in the bottom portion of said apparatus body is capable of opening and closing.

2. A facsimile apparatus, comprising:
an apparatus body including a body frame serving as a framework for said apparatus body;
a circuit substrate unit provided on said apparatus body;
a control circuit substrate arranged in the bottom portion of said apparatus body, said control circuit substrate being separated from said circuit substrate unit by said body frame;
cable means for electrically connecting said control circuit substrate and said circuit substrate unit, and other electric components;
a metallic bottom cover provided on the bottom portion of said apparatus body and serving as a support member for said control circuit substrate;
a shielding plate for noise shielding which is provided between said control circuit substrate and said body frame;
a gap portion formed between said shielding plate and said body frame, said gap being a space for arranging at least a portion of said cable means;
first connectors which are connected to said circuit substrate unit, said first connectors being mounted on said circuit substrate unit and positioned so as to face the aperture of said body frame when said circuit substrate unit is loaded into said apparatus body; and
second connectors which are connected to said control circuit substrate unit, said second connector being coupled with said first connectors through the aperture of said body frame.

3. A facsimile apparatus, comprising:
an apparatus body including a body frame serving as a framework for said apparatus body, said body frame having an aperture;
a first circuit substrate unit provided on said apparatus body and including a first frame;
a second circuit substrate unit provided on said apparatus body and including a second frame, said second circuit substrate unit being separated from said first circuit substrate unit by said body frame;
biasing members provided on either one of said first frame and said second frame; and
protruding members provided on the other of said first frame and said second frame, said protruding members are capable of being in contact with said biasing member by inserting said protruding members into the aperture of said body frame when said first circuit substrate unit and said second circuit substrate unit are fitted into said apparatus body, thereby establishing a ground connection between said first frame and said second frame.

* * * * *

UNITED STATES PATENT AND TRADEMARK OFFICE
CERTIFICATE OF CORRECTION

PATENT NO. : 5,260,802   Page 1 of 2
DATED      : November 9, 1993
INVENTOR(S): HIROMICHI NAGANE It is certified that error appears in the above-indentified patent and that said Letters Patent is hereby corrected as shown below:

COLUMN 1

Line 12, "be" should be deleted.
Line 18, "perform the maintenance work" should read --maintain--.
Line 62, "noise," should read --of noise,--.

COLUMN 2

Line 7, "a noise," should read --noise.--.
Line 14, "in stead" should read --instead--.
Line 53, "prevent" should read --prevent damage from-- and "and the" should read --and lightning,--.
Line 54, "falling of a thundervolt," should be deleted.

COLUMN 3

Line 13, "an" should be deleted and "insufficient" should read --inefficient--.
Line 26, "object" should read --objects--.
Line 64, "sensible" should read --sensitive--.

COLUMN 5

Line 6, "side" should read --a side--.

UNITED STATES PATENT AND TRADEMARK OFFICE
CERTIFICATE OF CORRECTION

PATENT NO. : 5,260,802
DATED : November 9, 1993
INVENTOR(S) : HIROMICHI NAGANE

It is certified that error appears in the above-indentified patent and that said Letters Patent is hereby corrected as shown below:

<u>COLUMN 6</u>

Line 7, "thermosensible" should read --thermosensitive--.

Signed and Sealed this

Twenty-seventh Day of September, 1994

Attest:

BRUCE LEHMAN

*Attesting Officer*          *Commissioner of Patents and Trademarks*